US010841235B2

(12) United States Patent
Kommula et al.

(10) Patent No.: US 10,841,235 B2
(45) Date of Patent: Nov. 17, 2020

(54) METHODS AND APPARATUS TO OPTIMIZE MEMORY ALLOCATION IN RESPONSE TO A STORAGE REBALANCING EVENT

(71) Applicant: VMware Inc., Palo Alto, CA (US)

(72) Inventors: Raja Kommula, Cupertino, CA (US); Raj Yavatkar, Saratoga, CA (US); Priyanka Tembey, San Francisco, CA (US)

(73) Assignee: VMWARE, INC, Palo Alto, AZ (US)

( * ) Notice: Subject to any disclaimer, the term of this patent is extended or adjusted under 35 U.S.C. 154(b) by 0 days.

(21) Appl. No.: 15/655,193

(22) Filed: Jul. 20, 2017

(65) Prior Publication Data

US 2019/0028400 A1 Jan. 24, 2019

(51) Int. Cl.
H04L 12/911 (2013.01)
H04L 12/801 (2013.01)
G06F 9/50 (2006.01)
H04L 12/26 (2006.01)

(52) U.S. Cl.
CPC ............ *H04L 47/70* (2013.01); *G06F 9/5016* (2013.01); *G06F 9/5061* (2013.01); *G06F 9/5077* (2013.01); *H04L 47/11* (2013.01); *H04L 47/12* (2013.01); *H04L 43/0882* (2013.01)

(58) Field of Classification Search
CPC .................. H04L 1/1835; H04L 1/1874; H04L 2012/5678; H04L 2012/5681; H04L 2012/6489; H04L 47/722; H04L 49/9005; H04L 49/9036; H04L 49/9047

See application file for complete search history.

(56) References Cited

U.S. PATENT DOCUMENTS

| 7,460,472 | B2 | 12/2008 | Le et al. |
| 7,483,376 | B2 | 1/2009 | Banerjee et al. |
| 7,609,721 | B2 | 10/2009 | Rao et al. |
| 7,640,292 | B1 | 12/2009 | Smoot |
| 8,121,135 | B2 | 2/2012 | Thathapudi et al. |
| 8,576,847 | B2 | 11/2013 | Hegde et al. |
| 9,787,559 | B1 | 10/2017 | Schroeder |
| 2005/0041635 | A1 | 2/2005 | Chung et al. |

(Continued)

FOREIGN PATENT DOCUMENTS

WO 2016123293 8/2016

OTHER PUBLICATIONS

International Searching Authority, "International Search Report and Written Opinion," issued in connection with application No. PCT/US2018/043116, dated Oct. 18, 2018, 12 pages.

(Continued)

*Primary Examiner* — Jason D Recek
*Assistant Examiner* — Lesa M Kennedy
(74) *Attorney, Agent, or Firm* — Hanley, Flight & Zimmerman, LLC

(57) ABSTRACT

Methods and apparatus to optimize memory allocation in response to a storage rebalancing event are disclosed. An example apparatus includes a telematics agent to detect a rebalancing event based on metadata; and a decision engine to identify a cluster corresponding to the rebalancing event by processing the metadata; and increase a number of jumbo buffers in a network switch corresponding to the cluster in response to the rebalancing event.

20 Claims, 10 Drawing Sheets

(56) References Cited

U.S. PATENT DOCUMENTS

| | | |
|---|---|---|
| 2005/0216693 A1* | 9/2005 | Craft .................. G06F 12/0888 |
| | | 711/173 |
| 2006/0080425 A1 | 4/2006 | Wood et al. |
| 2008/0104252 A1 | 5/2008 | Henniger |
| 2008/0320108 A1 | 12/2008 | Murty et al. |
| 2009/0019515 A1 | 1/2009 | Excoffier et al. |
| 2009/0262741 A1 | 10/2009 | Jungck et al. |
| 2009/0292858 A1 | 11/2009 | Lambeth et al. |
| 2011/0032935 A1 | 2/2011 | Yang |
| 2011/0302346 A1 | 12/2011 | Vahdat et al. |
| 2012/0051236 A1 | 3/2012 | Hegde et al. |
| 2012/0213070 A1* | 8/2012 | Lee .................... H04L 41/5003 |
| | | 370/231 |
| 2013/0044748 A1 | 2/2013 | Shah et al. |
| 2013/0124702 A1 | 5/2013 | Shah et al. |
| 2013/0145072 A1* | 6/2013 | Venkataraghavan ........................ |
| | | H04L 67/1097 |
| | | 710/316 |
| 2013/0223454 A1 | 8/2013 | Dunbar et al. |
| 2014/0050217 A1 | 2/2014 | Janakiraman et al. |
| 2014/0164640 A1 | 6/2014 | Ye et al. |
| 2014/0241203 A1 | 8/2014 | Elson |
| 2014/0372616 A1 | 12/2014 | Arisoylu et al. |
| 2015/0043379 A1 | 2/2015 | Shimokuni et al. |
| 2015/0071067 A1 | 3/2015 | Martin et al. |
| 2015/0071072 A1 | 3/2015 | Ratzin et al. |
| 2015/0078152 A1 | 3/2015 | Garg et al. |
| 2015/0092561 A1* | 4/2015 | Sigoure .................. H04L 49/50 |
| | | 370/236 |
| 2015/0163117 A1 | 6/2015 | Lambeth et al. |
| 2015/0277952 A1 | 10/2015 | Lin et al. |
| 2016/0065423 A1* | 3/2016 | Zhang .................... H04L 43/02 |
| | | 370/235 |
| 2016/0072642 A1 | 3/2016 | Shih |
| 2016/0105343 A1 | 4/2016 | Janarthanan et al. |
| 2016/0105364 A1 | 4/2016 | Kanonakis et al. |
| 2016/0283259 A1 | 9/2016 | Mehta |
| 2017/0149880 A1 | 5/2017 | Lochhead et al. |
| 2017/0163539 A1 | 6/2017 | Sreeramoju et al. |
| 2017/0195226 A1 | 7/2017 | Cho et al. |
| 2017/0244651 A1* | 8/2017 | Saxton .................. H04L 41/046 |
| 2017/0286167 A1* | 10/2017 | Zhu .......................... G06F 9/505 |
| 2017/0331740 A1 | 11/2017 | Levy et al. |
| 2017/0353874 A1 | 12/2017 | Harrang et al. |
| 2017/0366401 A1 | 12/2017 | Jiang et al. |
| 2018/0004558 A1 | 1/2018 | Das Sharma |
| 2018/0013583 A1 | 1/2018 | Rubenstein et al. |
| 2018/0026895 A1 | 1/2018 | Wang et al. |
| 2018/0091591 A1 | 3/2018 | Puri et al. |
| 2018/0097734 A1 | 4/2018 | Boutros et al. |
| 2018/0139101 A1 | 5/2018 | Puri |
| 2018/0183683 A1 | 6/2018 | Geng et al. |
| 2018/0241664 A1 | 8/2018 | Singh et al. |
| 2018/0316618 A1 | 11/2018 | Brown et al. |
| 2018/0343162 A1* | 11/2018 | Ohsuga ............... H04L 41/0668 |
| 2018/0359131 A1 | 12/2018 | Cheng et al. |
| 2018/0373553 A1 | 12/2018 | Connor et al. |
| 2019/0028342 A1 | 1/2019 | Kommula et al. |
| 2019/0028345 A1 | 1/2019 | Kommula et al. |
| 2019/0028382 A1 | 1/2019 | Kommula et al. |

OTHER PUBLICATIONS

United States Patent and Trademark Office, "Non-Final Office Action," issued in connection with U.S. Appl. No. 15/655,632, dated Dec. 21, 2018, 16 pages.

United States Patent and Trademark Office, "Non-Final Office Action," dated Apr. 11, 2019 in connection with U.S. Appl. No. 15/655,197 (37 pages).

United States Patent and Trademark Office, "Final Rejection," dated Jun. 10, 2019 in connection with U.S. Appl. No. 15/655,632 (28 pages).

United States Patent and Trademark Office, "Non-Final Office Action," issued in connection with U.S. Appl. No. 15/655,625, dated Feb. 26, 2019, 31 pages.

United States Patent and Trademark Office, "Final Office Action," issued in connection with U.S. Appl. No. 15/655,625 dated Sep. 4, 2019, 28 pages.

United States Patent and Trademark Office, "Notice of Allowance," issued in connection with U.S. Appl. No. 15/655,197 dated Aug. 30, 2019, 8 pages.

United States Patent and Trademark Office, "Non-Final Office Action," issued in connection with U.S. Appl. No. 15/655,632, dated Nov. 1, 2019 (10 pages).

United States Patent and Trademark Office, "Notice of Allowance," issued in connection with U.S. Appl. No. 15/655,632 , dated Apr. 15, 2020, 17 pages.

United States Patent and Trademark Office, "Non-Final Office Action," issued in connection with U.S. Appl. No. 15/655,625 , dated Apr. 30, 2020, 34 pages.

\* cited by examiner

METHODS AND APPARATUS TO OPTIMIZE MEMORY ALLOCATION IN RESPONSE TO A STORAGE REBALANCING EVENT

FIELD OF THE DISCLOSURE

The present disclosure relates generally to cloud computing and, more particularly, to methods and apparatus to optimize memory allocation in response to a storage rebalancing event.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

DETAILED DESCRIPTION

Figure 1:
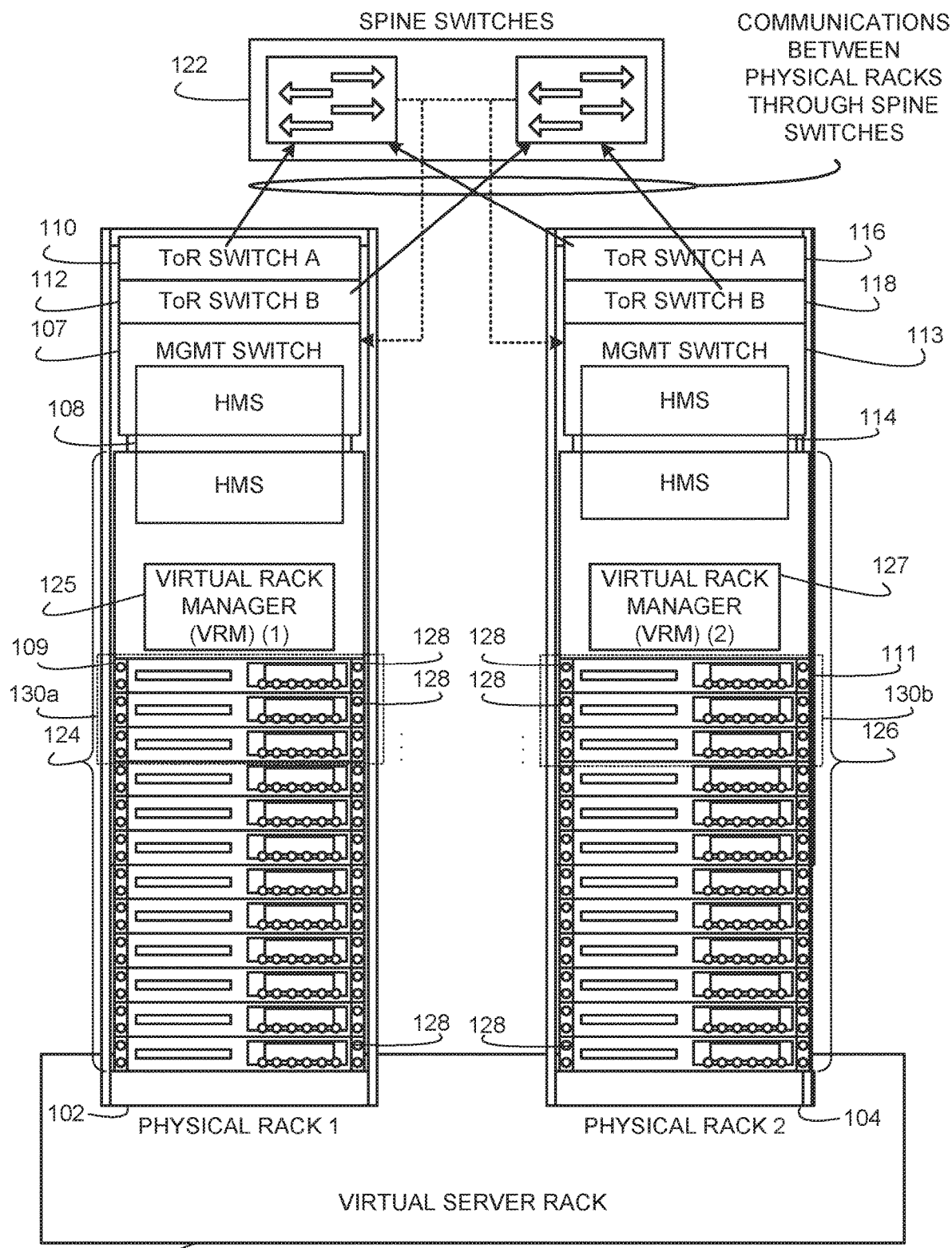
FIG. 1 depicts example physical racks in an example virtual server rack deployment.

Cloud computing is based on the deployment of many physical resources across a network, virtualizing the physical resources into virtual resources, and provisioning the virtual resources in software defined data centers (SDDCs) for use across cloud computing services and applications. Examples disclosed herein may be used to manage network resources in SDDCs to improve performance and efficiencies of network communications between different virtual and/or physical resources of the SDDCs. Examples disclosed herein may be used in connection with different types of SDDCs. In some examples, techniques disclosed herein are useful for managing network resources that are provided in SDDCs based on Hyper-Converged Infrastructure (HCI). In examples disclosed herein, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment.

Examples disclosed herein may be used with one or more different types of virtualization environments. Three example types of virtualization environment are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random access memory (RAM) with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft Hyper-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all of the underlying hardware resources of the server (e.g., without accessing an intermediate virtual hardware resource). In a typical paravirtualization system, a host OS (e.g., a Linux-based OS) is installed on the server hardware. A hypervisor (e.g., the Xen® hypervisor) executes on the host OS. VMs including virtual hardware resources are then deployed on the hypervisor. The hypervisor manages the association between the hardware resources of the server hardware and the virtual resources allocated to the VMs (e.g., associating physical random access memory (RAM) with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the Docker™ container platform, the OpenVZ™ container platform, etc.

In some examples, a data center (or pool of linked data centers) may include multiple different virtualization environments. For example, a data center may include hardware resources that are managed by a full virtualization environment, a paravirtualization environment, and an OS virtualization environment. In such a data center, a workload may be deployed to any of the virtualization environments. Through techniques to monitor both physical and virtual infrastructure, examples disclosed herein provide visibility into the virtual infrastructure (e.g., VMs), virtual storage, virtual networks and their control/management counterparts) and the physical infrastructure (servers, physical storage, network switches).

Prior converged and hyper-converged systems enable deploying and operating private clouds by offering an integrated system. However, most of such prior products lack a single governing entity that has visibility into and end-to-end control over an entire (virtual and physical) infrastructure. The lack of a single governing entity makes it difficult to correlate related events such as relating switch congestion to a particular traffic source in a VM, or taking preemptive traffic management action (e.g., a scheduled VM migration event could be used to proactively select an end-to-end network path that does not impact the software-defined data storage traffic), or reflecting network I/O control (NIOC) (e.g., VMWARE® ESXI™ NIOC) configurations at the switch level for end-to-end Quality of Storage (QoS) control during traffic events like software-defined data storage rebalancing. Examples disclosed herein overcome limitations of prior systems by enabling observing and controlling both virtual and physical infrastructures of self-contained private clouds. Examples disclosed herein collect telemetrics data from switches, hosts, and hypervisor-based virtual infrastructure and take remedial actions based on telematics analyses and user configured policies.

Examples disclosed herein may be employed with HCI-based SDDCs deployed using virtual server rack systems such as the virtual server rack 106 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 2 and 3, multi-rack deployments can include Top-of-the-Rack (ToR) switches (e.g., leaf switches) and spine switches connected using a Leaf-Spine architecture. A virtual server rack system also includes software-defined data storage (e.g., VIRTUAL SAN™) distributed across multiple hosts for redundancy and virtualized networking software (e.g., NSX™).

A drawback of some virtual server rack systems is that different hardware components located therein can be procured from different equipment vendors, and each equipment vendor can have its own independent OS installed on its hardware. For example, physical hardware resources include white label equipment such as white label servers, white label network switches, white label external storage arrays, and white label disaggregated rack architecture systems (e.g., Intel's Rack Scale Architecture (RSA)). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding. In some examples, virtual server rack systems additionally manage non-white label equipment such as original equipment manufacturer (OEM) equipment. Such OEM equipment includes OEM Servers such as HEWLETT-PACKARD® (HP) servers and LENOVO® servers, and OEM Switches such as switches from ARISTA NETWORKS™, and/or any other OEM server, switches, or equipment. In any case, each equipment vendor can have its own independent OS installed on its hardware. For example, ToR switches and spine switches can have OSs from vendors like CISCO® and ARISTA NETWORKS™ while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration may require additional network bandwidth, which is utilized for the duration of a reconfiguration, followed by a decrease in bandwidth back to a default configuration.

Examples disclosed herein provide HCI-based SDDCs with system-level governing features that can actively monitor and manage different hardware and software components of a virtual server rack system even when such different hardware and software components execute different OSs. As described in connection with FIG. 3, major components of a virtual server rack system include a hypervisor, network virtualization software, storage virtualization software (e.g., software-defined data storage), a physical network OS, and external storage. In some examples, the storage virtualization (VIRTUAL SAN™) is integrated with the hypervisor. In examples in which the physical network OS is isolated from the network virtualization software, the physical network is not aware of events occurring in the network virtualization environment and the network virtualization environment is not aware of events occurring in the physical network.

Examples disclosed herein improve the recovery of a host and/or disk going down/up (e.g., an error has occurred in the host/disk, and/or when a request is sent by a customer for more or less network resources to be deployed) by reallocating switch buffer resources to increase the number of jumbo buffers. For example, when a host and/or disk in a cluster of hosts goes down, the available resources may no longer comply with a customer's request (e.g., service level agreement (SLA)). Accordingly, a system virtualizer may rearrange server nodes by controlling switches corresponding to the server nodes to meet availability requirements according to the SLA (e.g., corresponding to a total number of resources that must be available in a virtual system). For example, if a host/disk goes down, the system virtualizer reallocates system resources such that the system properly and efficiently operates according to the SLA (e.g., until the effected host/disk is back up and running). Such rearranging is more efficient when executed using jumbo maximum transmission units (MTU). Jumbo MTUs are handled by the switches using jumbo buffers. However, prior systems include a preset number of jumbo buffers and a preset number of smaller buffers. Examples disclosed herein reallocate the buffer configuration of a switch in response to a disk rebalancing event to temporarily increase the number of jumbo buffers, thereby increasing the efficiency of the recovery corresponding to a rebalancing event. Examples disclosed herein include determining that a rebalancing event is occurring and reallocating buffer resources to combine smaller buffers into jumbo buffers for a duration of time corresponding to the rebalancing event. In this manner, the system virtualizer can rearrange data in the remaining disk and/or hosts using the switches in a more efficient manner than prior systems. Although examples disclosed herein are described in the context of a temporary increase of jumbo buffers resources, examples disclosed herein may be utilized based on any network configuration change that optimizes network operation in response to a temporary network event.

FIG. 1 depicts example physical racks 102, 104 in an example deployment of the virtual server rack 106. The virtual server rack 106 of the illustrated example enables abstracting hardware resources (e.g., physical hardware resources 124, 126). In some examples, the virtual server rack 106 includes a set of physical units (e.g., one or more racks) with each unit including hardware such as server nodes (e.g., compute+storage+network links), network switches, and, optionally, separate storage units. From a user perspective, the example virtual server rack 106 is an aggregated pool of logic resources exposed as one or more VMWARE® ESX I™ clusters (e.g., example clusters 130a, 130b) along with a logical storage pool and network connectivity. In examples disclosed herein, a cluster is a server group in a virtual environment. For example, a VMWARE® ESX I™ cluster (e.g., example clusters 130a, 130b) is a group of physical servers in the physical hardware resources that run ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 has an example top-of-rack (ToR) switch A 110, an example ToR switch B 112, an example management switch 107, and an example server host node(0) 109. In the illustrated example, the management switch 107 and the server host node(0) 109 run a hardware management system (HMS) 108 for the first physical rack 102. The second physical rack 104 of the illustrated example is also provided with an example ToR switch A 116, an example ToR switch B 118, an example management switch 113, and an example server host node (0) 111. In the illustrated example, the management switch 113 and the server host node (0) 111 run an HMS 114 for the second physical rack 104.

In the illustrated example, the HMS 108, 114 connects to server management ports of the server host node(0) 109, 111 (e.g., using a baseboard management controller (BMC)), connects to ToR switch management ports (e.g., using 1 gigabits per second (Gbps) links) of the ToR switches 110, 112, 116, 118, and also connects to spine switch management ports of one or more spine switches 122. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private Internet protocol (IP) management network for out-of-band (OOB) management. The HMS 108, 114 of the illustrated example uses this OOB management interface to the server management ports of the server host node(0) 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management. In examples disclosed herein, the ToR switches 110, 112, 116, 118 connect to server network interface card (NIC) ports (e.g., using 10 Gbps links) of example server hosts 128 (e.g., including the server host nodes(0) 109, 111) in the physical racks 102, 104 for downlink communications and to the spine switch(es) 122 (e.g., using 30 Gbps links) for uplink communications. In the illustrated example, the management switch 107, 113 is also connected to the ToR switches 110, 112, 116, 118 (e.g., using a 10 Gbps link) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126) of the physical rack 102, 104. In the illustrated example, the D3 connection interfaces to physical hardware resources 124, 126 via an OS running on the server nodes using an OS-specific application programming interfaces (API) such as VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of non-responsive hosts, monitoring catastrophic hardware failures, and firmware upgrades. The example HMS 108, 114 uses D3 management to periodically monitor status and health of the physical resources 124, 126 and to keep server objects and switch objects up to date. Example D3 operations performed by the HMS 108, 114 include controlling power state, accessing temperature sensors, controlling BIOS (Basic Input/Output System) inventory of hardware (e.g., central processing units (CPUs), memory, disks, etc.), event monitoring, and logging events.

The HMSs 108, 114 of the corresponding physical racks 102, 104 interface with virtual rack managers (VRMs) 125, 127 of the corresponding physical racks 102, 104 to instantiate and manage the virtual server rack 106 using physical hardware resources 124, 126 (e.g., processors, NICs, servers, switches, storage devices, peripherals, power supplies, etc.) of the physical racks 102, 104. In the illustrated example, the VRM 125 of the first physical rack 102 runs on the example cluster 130a of three server host nodes from the example hosts 128 of the first physical rack 102, one of which is the server host node(0) 109. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit. Also in the illustrated example, the VRM 127 of the second physical rack 104 runs on the example cluster 130b of three server host nodes from the example hosts 128 of the second physical rack 104, one of which is the server host node(0) 111. In the illustrated example, the VRMs 125, 127 of the corresponding physical racks 102, 104 communicate with each other through one or more spine switches 122. Also in the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The VRM 125 of the first physical rack 102 runs on the example cluster 130a of three server host nodes from the example hosts 128 of the first physical rack 102 using a high availability (HA) mode configuration. In addition, the VRM 127 of the second physical rack 104 runs on the example cluster 130b of three server host nodes from the example hosts 128 of the second physical rack 104 using the HA mode configuration. Using the HA mode in this manner, enables fault tolerant operation of the VRM 125, 127 in the event that one of the three server host nodes 128 one or more of the example cluster 130a, 130b for the VRM 125, 127 fails. Upon failure of a server host node 128 executing the VRM 125, 127, the VRM 125, 127 can be restarted to execute on another one of the hosts 128 in the cluster 130a, 130b. Therefore, the VRM 125, 127 continues to be available even in the event of a failure of one of the server host nodes 128 in the cluster 130a, 130b.

In examples disclosed herein, a command line interface (CLI) and APIs are used to manage the ToR switches 110, 112, 116, 118. For example, the HMS 108, 114 uses CLI/APIs to populate switch objects corresponding to the ToR switches 110, 112, 116, 118. On HMS bootup, the HMS 108, 114 populates initial switch objects with statically available information. In addition, the HMS 108, 114 uses a periodic polling mechanism as part of an HMS switch management application thread to collect statistical and health data from the ToR switches 110, 112, 116, 118 (e.g., Link states, Packet Stats, Availability, etc.). There is also a configuration buffer as part of the switch object which stores the configuration information to be applied on the switch.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113) in the physical rack 102, 104. However, any other programming language and any other OS may be used to implement the HMS 108, 114.

Figure 2:
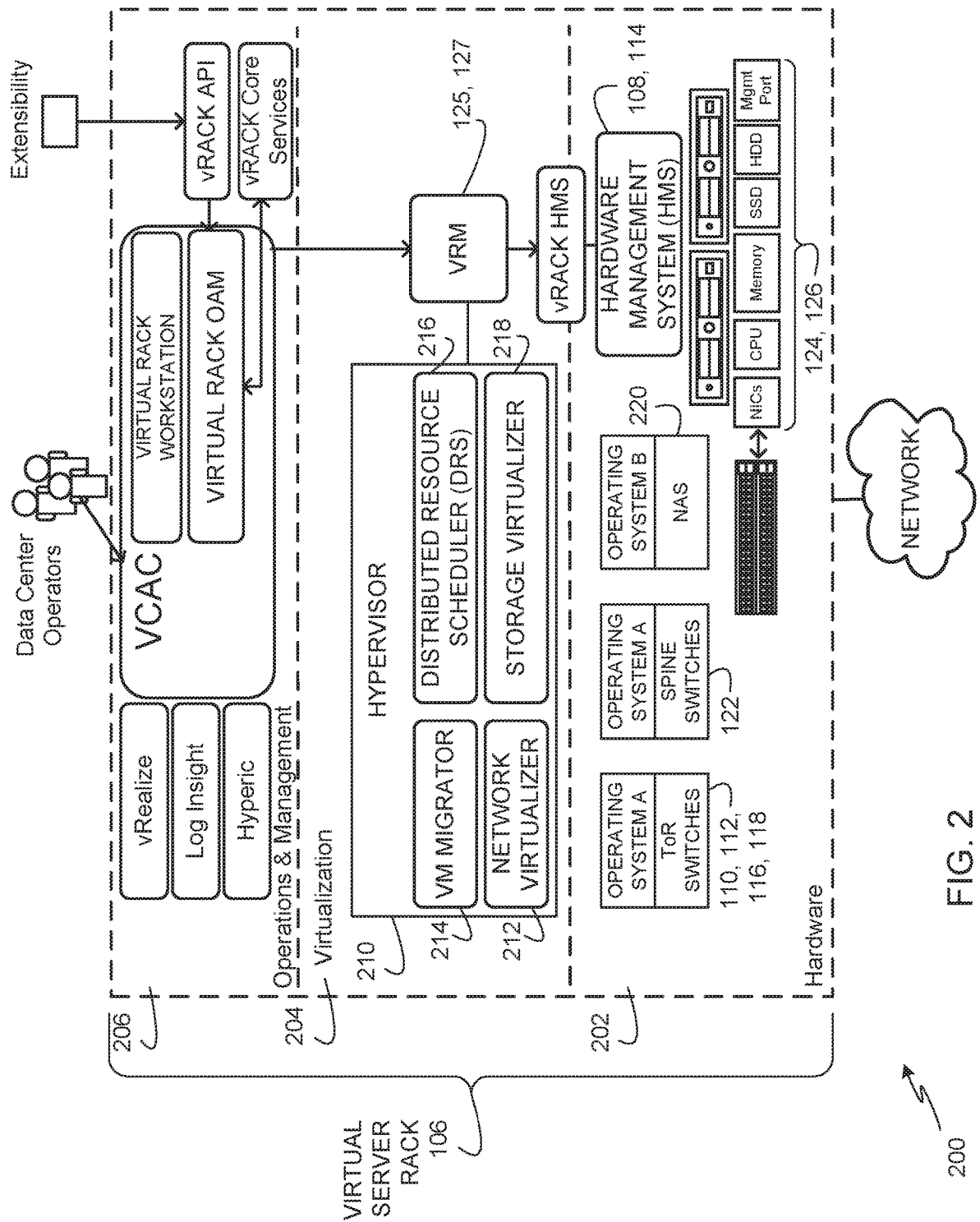
FIG. 2 depicts an example architecture to configure and deploy the example virtual server rack of FIG. 1.

FIG. 2 depicts an example virtual server rack architecture 200 that may be used to configure and deploy the virtual server rack 106 of FIG. 1. The example architecture 200 of FIG. 2 includes a hardware layer 202, a virtualization layer 204, and an operations and management (OAM) layer 206. In the illustrated example, the hardware layer 202, the virtualization layer 204, and the OAM layer 206 are part of the example virtual server rack 106 of FIG. 1. The virtual server rack 106 of the illustrated example is based on the physical racks 102, 104 of FIG. 1. The example virtual server rack 106 configures the physical hardware resources 124, 126, virtualizes the physical hardware resources 124, 126 into virtual resources, provisions virtual resources for use in providing cloud-based services, and maintains the physical hardware resources 124, 126 and the virtual resources.

The example hardware layer 202 of FIG. 2 includes the HMS 108, 114 of FIG. 1 that interfaces with the physical hardware resources 124, 126 (e.g., processors, NICs, servers, switches, storage devices, peripherals, power supplies, etc.), the ToR switches 110, 112, 116, 118 of FIG. 1, the spine switches 122 of FIG. 1, and network attached storage (NAS) hardware 220. The HMS 108, 114 is configured to manage individual hardware nodes such as different ones of the physical hardware resources 124, 126. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 106 in a hardware-independent manner. The HMS 108, 114 also supports rack-level boot-up sequencing of the physical hardware resources 124, 126 and provides services such as secure resets, remote resets, and/or hard resets of the physical hardware resources 124, 126.

The HMS 108, 114 of the illustrated example is part of a dedicated management infrastructure in a corresponding physical rack 102, 104 including the dual-redundant management switches 107, 113 and dedicated management ports attached to the server host nodes(0) 109, 111 and the ToR switches 110, 112, 116, 118. In the illustrated example, one instance of the HMS 108, 114 runs per physical rack 102, 104. For example, the HMS 108, 114 may run on the management switch 107, 113 and the server host node(0) 109, 111 installed in the example physical rack 102 of FIG. 1. In the illustrated example of FIG. 1 both of the HMSs 108, 114 are provided in corresponding management switches 107, 113 and the corresponding server host nodes(0) 109, 111 as a redundancy feature in which one of the HMSs 108, 114 is a primary HMS, while the other one of the HMSs 108, 114 is a secondary HMS. In this manner, one of the HMSs 108, 114 may take over as a primary HMS in the event of a failure of a hardware management switch 107, 113 and/or a failure of the server host nodes(0) 109, 111 on which the other HMS 108, 114 executes. In some examples, to achieve seamless failover, two instances of an HMS 108, 114 run in a single physical rack 102, 104. In such examples, the physical rack 102, 104 is provided with two management switches, and each of the two management switches runs a separate instance of the HMS 108, 114. In such examples, the physical rack 102 of FIG. 1 runs two instances of the HMS 108 on two separate physical hardware management switches and two separate server host nodes(0), and the physical rack 104 of FIG. 1 runs two instances of the HMS 114 on two separate physical hardware management switches and two separate server host nodes(0). In this manner, for example, one of the instances of the HMS 108 on the physical rack 102 serves as the primary HMS 108 and the other instance of the HMS 108 serves as the secondary HMS 108. The two instances of the HMS 108 on two separate management switches and two separate server host nodes(0) in the physical rack 102 (or the two instances of the HMS 114 on two separate management switches and two separate server host nodes(0) in the physical rack 104) are connected over a point-to-point, dedicated Ethernet link which carries heartbeats and memory state synchronization between the primary and secondary HMS instances.

The example virtualization layer 204 includes the VRM 125, 127. The example VRM 125, 127 communicates with the HMS 108, 114 to manage the physical hardware resources 124, 126. The example VRM 125, 127 creates the example virtual server rack 106 out of underlying physical hardware resources 124, 126 that may span one or more physical racks (or smaller units such as a hyper-appliance or half rack) and handles physical management of those resources. The example VRM 125, 127 uses the virtual server rack 106 as a basis of aggregation to create and provide operational views, handle fault domains, and scale to accommodate workload profiles. The example VRM 125, 127 keeps track of available capacity in the virtual server rack 106, maintains a view of a logical pool of virtual resources throughout the SDDC life-cycle, and translates logical resource provisioning to allocation of physical hardware resources 124, 126. The example VRM 125, 127 interfaces with an example hypervisor 210 of the virtualization layer 204. The example hypervisor 210 is installed and runs on the example server hosts 128 in the example physical resources 124, 126 to enable the server hosts 128 to be partitioned into multiple logical servers to create VMs. In some examples, the hypervisor 210 may be implemented using a VMWARE® ESXI™ hypervisor available as a component of a VMWARE® VSPHERE® virtualization suite developed and provided by VMWARE®, Inc. The VMWARE® VSPHERE® virtualization suite is a collection of components to setup and manage a virtual infrastructure of servers, networks, and other resources In the illustrated example of FIG. 2, the hypervisor 210 is shown having a number of virtualization components executing thereon including an example network virtualizer 212, an example VM migrator 214, an example distributed resource scheduler 216, and an example storage virtualizer 218. In the illustrated example, the VRM 125, 127 communicates with these components to manage and present the logical view of underlying resources such as the hosts 128 and the clusters 130a, 130b. The example VRM 125, 127 also uses the logical view for orchestration and provisioning of workloads.

The example network virtualizer 212 virtualizes network resources such as physical hardware switches (e.g., the management switches 107, 113 of FIG. 1, the ToR switches 110, 112, 116, 118, and/or the spine switches 122) to provide software-based virtual networks. The example network virtualizer 212 enables treating physical network resources (e.g., switches) as a pool of transport capacity. In some examples, the network virtualizer 212 also provides network and security services to VMs with a policy driven approach. The network virtualizer 212 includes a number of components to deploy and manage virtualized network resources across servers, switches, and clients. For example, the network virtualizer 212 includes a network virtualization manager that functions as a centralized management component of the network virtualizer 212 and runs as a virtual appliance on one of the server hosts 128. In some examples, the network virtualizer 212 may be implemented using a VMWARE® NSX™ network virtualization platform that includes a number of components including a VMWARE® NSX™ network virtualization manager.

The example VM migrator 214 is provided to move or migrate VMs between different hosts 128 without losing state during such migrations. For example, the VM migrator 214 allows moving an entire running VM from one physical server to another with substantially little or no downtime. The migrating VM retains its network identity and connections, which results in a substantially seamless migration process. The example VM migrator 214 enables transferring the VM's active memory and precise execution state over a high-speed network, which allows the VM to switch from running on a source server host to running on a destination server host.

The example distributed resource scheduler (DRS) 216 is provided to monitor resource utilization across resource pools, to manage resource allocations to different VMs, to deploy additional storage capacity to VM clusters 130a, 130b with substantially little or no service disruptions, and to work with the VM migrator 214 to automatically migrate VMs during maintenance with substantially little or no service disruptions.

The example storage virtualizer 218 is software-defined storage for use in connection with virtualized environments. The example storage virtualizer 218 clusters server-attached hard disk drives (HDDs) and solid state drives (SSDs) to create a shared datastore for use as virtual storage resources in virtual environments. In some examples, the storage virtualizer 218 may be implemented using a VMWARE® VIRTUAL SAN™ network data storage virtualization component developed and provided by VMWARE®, Inc.

The virtualization layer 204 of the illustrated example, and its associated components are configured to run VMs. However, in other examples, the virtualization layer 204 may additionally or alternatively be configured to run containers. For example, the virtualization layer 204 may be used to deploy a VM as a data computer node with its own guest OS on a host 128 using resources of the host 128. Additionally or alternatively, the virtualization layer 204 may be used to deploy a container as a data computer node that runs on top of a host OS without the need for a hypervisor or separate OS.

In the illustrated example, the OAM layer 206 is an extension of a VMWARE® VCLOUD® AUTOMATION CENTER™ (VCAC) that relies on the VCAC functionality and also leverages utilities such as VREALIZE™, Log Insight™, and VMWARE VCENTER™ HYPERIC® to deliver a single point of SDDC operations and management. The example OAM layer 206 is configured to provide different services such as health monitoring service, capacity planner service, maintenance planner service, events and operational view service, and virtual rack application workloads manager service.

Example components of FIG. 2 may be implemented using products developed and provided by VMWARE®, Inc. Alternatively, some or all of such components may alternatively be supplied by components with the same or similar features developed and provided by other virtualization component developers.

Figure 3:
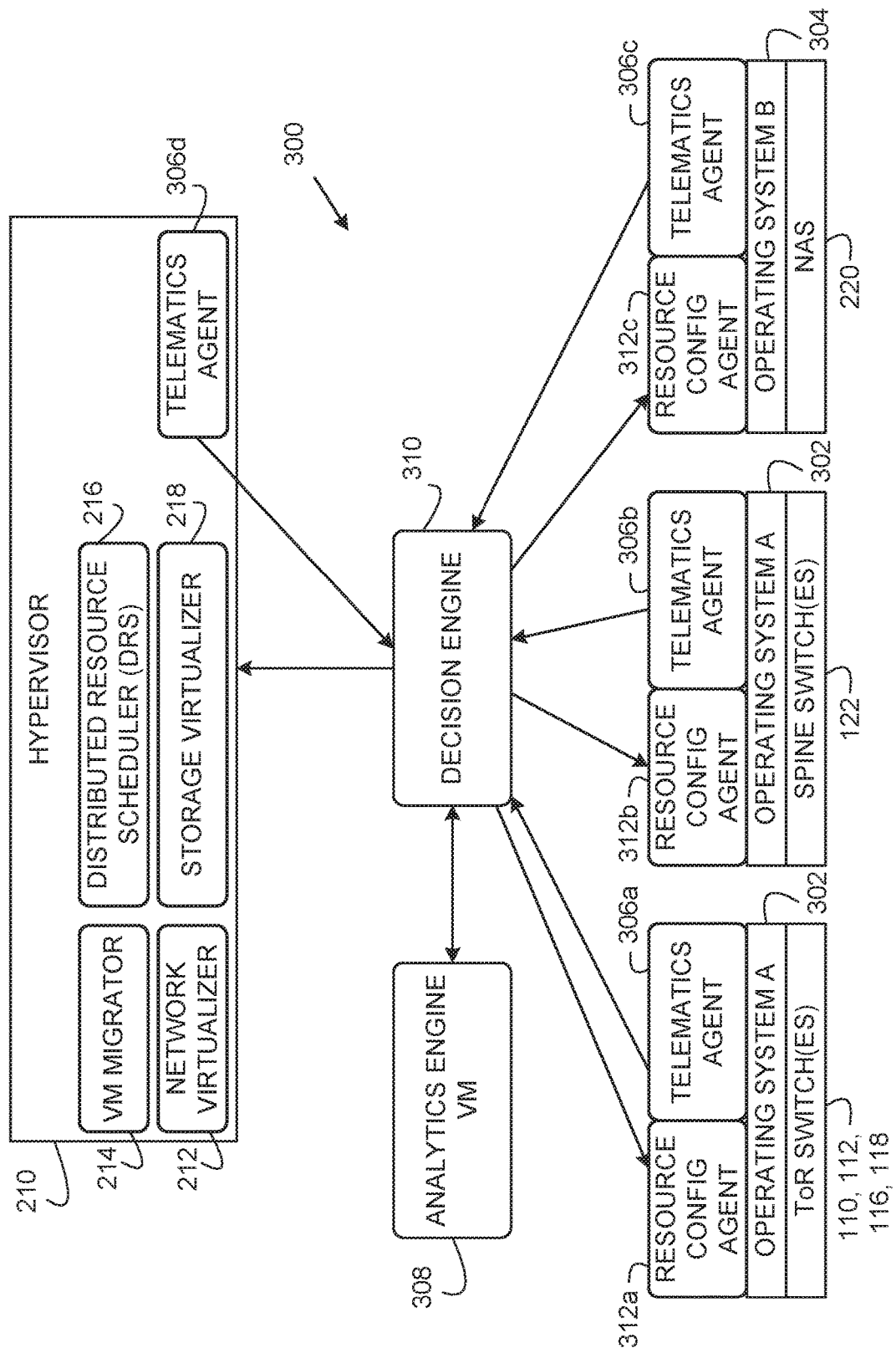
FIG. 3 depicts an example virtual cloud management system that may be used to implement examples disclosed herein.

FIG. 3 depicts an example virtual cloud management system 300 that may be used to implement examples disclosed herein. The example virtual cloud management system 300 includes the example network virtualizer 212, the example VM migrator 214, the example DRS 216, and the example storage virtualizer 218 of FIG. 2. In the illustrated example, the virtual cloud management system 300 is implemented using a SDDC deployment and management platform such as the VMWARE® Cloud Foundation (VCF) platform developed and provided by VMWARE®, Inc. The example virtual cloud management system 300 manages different parameters of the ToR switches 110, 112, 116, 118, the spine switches 122, and the NAS 220. The example virtual cloud management system 300 commands different components even when such components run different OSs. For example, the ToR switches 110, 112, 116, 118 and the spine switches 122 run OS A 302, and the NAS 220 runs OS B 304. In the illustrated example, the OS A 302 and the OS B 304 are different types of OSs. For example, the OS A 302 and the OS B 304 may be developed by different companies, may be developed for different hardware, maybe developed for different functionality, may include different kernels, and/or may be different in other ways. In some examples, the OS A 302 may be implemented using a Cisco NX-OS (developed and provided by Cisco Systems, Inc.) that can be run on leaf switches and/or spine switches, and the OS B 304 may be implemented using an EMC NAS OS (developed and provided by EMC CORPORATION®) that runs on network attached storage devices. In the illustrated example of FIG. 3, the OS A 302 and the OS B 304 are unaware of the events occurring in the hypervisor 210. However, examples disclosed herein enable monitoring different OSs across physical resources at a system level to provides cooperative inter-OS and inter-resource management.

The example virtual cloud management system 300 includes example telematics agents 306a-d, an example analytics engine 308, an example decision engine 310, and example resource configuration agents 312a-c. In the illustrated example, the telematics agents 306a-d are provided to collect information from different hardware resources and provide the information to the example decision engine 310. In the illustrated example, the telematics agents 306a-d are provided as add-on modules installable and executable on the different components. For example, the telematics agent 306a is installed and executed on the OS A 302 of the ToR switches 110, 112, 116, 118, the example telematics agent 306b is installed and executed on the OS A 302 of the spine switches 122, the example telematics agent 306c is installed and executed on the OS B 304 of the NAS 220, and the example telematics agent 306d is installed and executed on the hypervisor 210. In the illustrated example, the telematics agents 306a-d run on respective components while creating substantially little or no interference to the OSs of those components. For example, the telematics agents 306a-d may be implemented as a set of Access Control List (ACL) rules that operate as data collection rules to capture signatures of events that are happening in the virtual cloud management system 300. Such data collection rules can include static rules and/or dynamic rules. Example data collection rules can be used to collect statistics for various packet flows, to detect starts of VM migrations, to detect starts of virtualized storage rebalancing, to collect virtual extensible local area network (VXLAN) flow statistics, to collect L2 hop counts between various media access control (MAC) addresses, to collect quality of service (QoS) statistics, to collect maximum transmission unit (MTU) configurations, to collect equal-cost multi-path (ECMP) routing hash policies, to collect routing changes, etc. The example telematics agents 306a-d collect such information periodically and send the telematics-collected information to the example decision engine 310 for analysis by the example analytics engine 308 and to identify subsequent responsive action based on such telematics-collected information.

The example decision engine 310 runs on a VM and is provided to make decisions based on analyses of the telematics-collected information received from the telematics agents 306a-d. For example, the decision engine 310 can program the resource configuration agents 312a-c based on analyses of the telematics-collected information performed by the analytics engine 308. In some examples, the telematics-collected information is low-level primitive data, and the decision engine 310 is configured to identify high-level events based on such low-level primitive data. For example, if the telematics-collected information includes low-level primitive data indicative of statistics for various packet flows, the decision engine 310 may identify a high-level event such as a network misconfiguration or an under-provisioning of network resources based on too many dropped packets for certain packet flows. In another example, if the telematics-collected information includes low-level primitive data that reflects the start of a VM migration, the decision engine 310 identifies an imminent need for a large amount of network bandwidth to perform such VM migration. In yet another example, if the telematics-collected information includes low-level primitive data that reflects the start of virtualized storage rebalancing, the decision engine 310 identifies an imminent burst of virtualized storage traffic based on the possibility that a disk is either being added or deleted. In yet another example, if the telematics-collected information includes low-level primitive data that reflects VXLAN flow statistics, the decision engine 310 identifies use of large amounts of network bandwidth based on VM network usage reflected in the VXLAN flow statistics. In yet another example, if the telematics-collected information includes low-level primitive data that reflects L2 hop counts between various MAC addresses, the decision engine 310 identifies an opportunity to migrate VMs closer to one another (e.g., migrate VMs to the server hosts that are in the same physical rack or on neighboring physical racks) based on collected L2 hop count information in combination with VXLAN flow statistics. The example decision engine 310 is further described below in conjunction with FIG. 4.

The example analytics engine 308 runs on a VM and is provided to analyze the telematics-collected information received from the telematics agents 306a-d. For example, the analytics engine 308 can perform big data analyses by periodically accessing the telematics-collected information and analyzing the information, for example, for any system misconfigurations and/or inconsistencies. Some example types of analyses include analyzing information collected using packet sniffers (e.g., filters) in physical switches to: detect elephant flows and optimize network resources to handle such elephant flows, identify security issues, identify out-of-order delivery of packets, identify network bottlenecks, identify MTU misconfigurations, etc. Another example type of analysis includes analyzing syslog (system log) messages to identify critical system issues.

The example resource configuration agents 312a-c provide hardware agnostic APIs, which can be accessed by the decision engine 310 to change hardware configurations of corresponding hardware resources (e.g., the ToR switches 110, 112, 116, 118; the spine switches 122; the NAS 220, etc.). In this manner, the example decision engine 310 can improve operating and/or communication performances and/or efficiencies of the virtual server rack 106 (FIG. 1) by programming configurations of hardware resources via the resource configuration agents 312a-c in response to different events detected based on the analyses of the telematics-collected information performed by the analytics engine 308.

Figure 4:
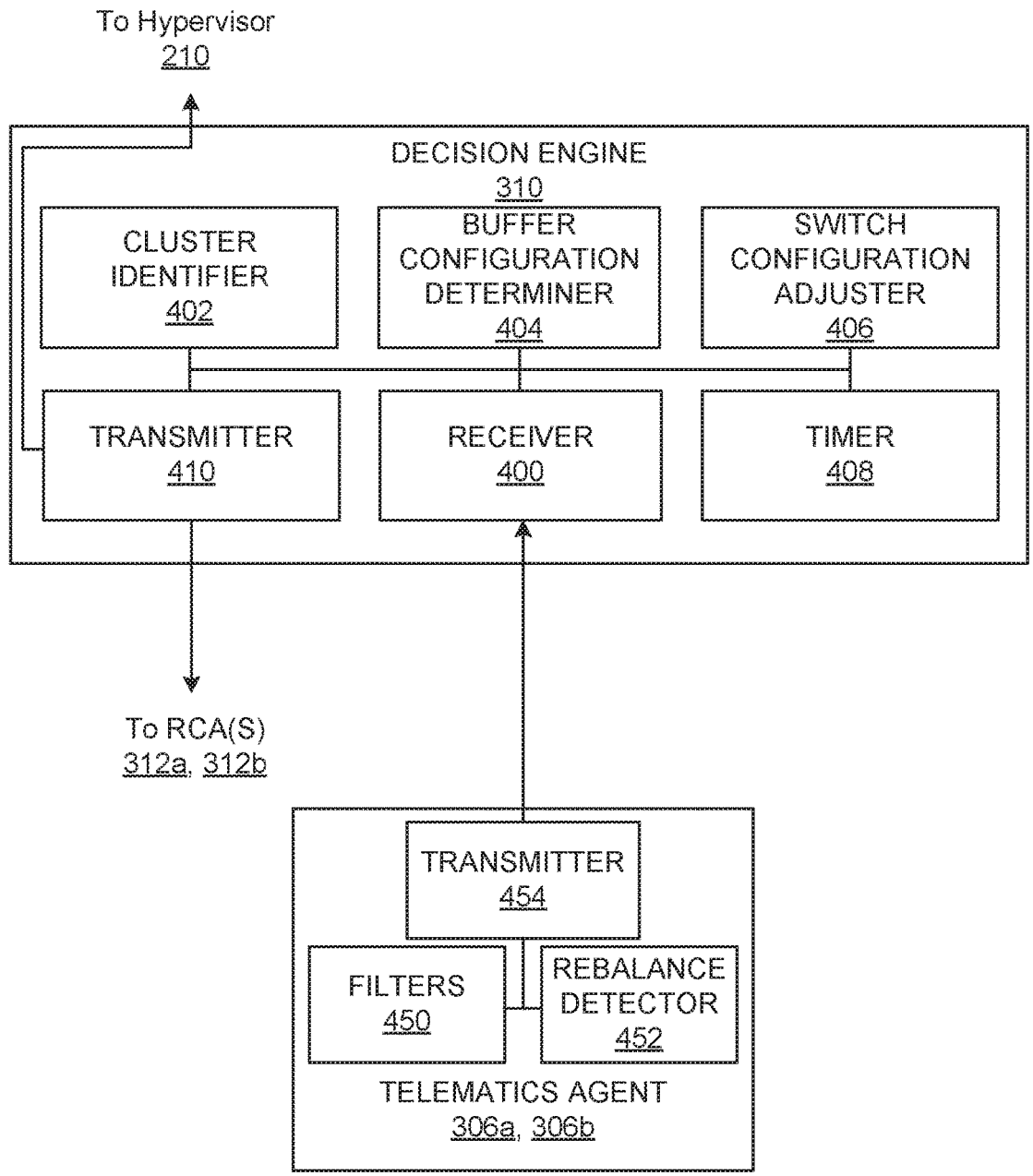
FIG. 4 is a block diagram of an example decision engine and example telematics agent of FIG. 3.

FIG. 4 is a block diagram of an example implementation of the decision engine 310 of FIG. 3 to optimize memory allocation in response to a storage rebalancing event. The example decision engine 310 of FIG. 4 includes an example receiver 400, an example cluster identifier 402, an example buffer configuration determiner 404, an example switch configuration adjuster 406, an example timer 408, and an example transmitter 410.

The example receiver 400 of FIG. 4 receives a trigger (e.g., a signal) from the example telematics agent 306a, 306b corresponding to a storage rebalance event (e.g., VIRTUAL SAN™ rebalance event). As further described below, the telematics agent 306a, 306b monitors storage virtualizer 218 (e.g., VIRTUAL SAN™) activity by examining storage virtualizer (e.g., VIRTUAL SAN™) metadata packets. For example, when one or more of the example hosts 128 and/or disks within the example hosts 128 goes up/down, the example storage virtualizer 218 rearranges data in the remaining disks/hosts 128 to meet the availability requirements. Accordingly, the example telematics agent 306a, 306b examines the VIRTUAL SAN™ metadata packets to identify a signature of re-balancing by the storage virtualizer 218. The example receiver 400 receives a signal (e.g., trigger) identifying the rebalance signature and/or the metadata corresponding to the rebalance signature. Additionally, the example receiver 400 may receive a second trigger corresponding to the end of a storage rebalance event (e.g., a VIRTUAL SAN™ rebalance event). The second trigger may correspond to the end of a duration of time (e.g., tracked by the example timer 408) or may correspond to a rebalancing end event trigger (e.g., determined by the example telematics agent 306a, 306b and received by the example receiver 400).

The example cluster identifier 402 of FIG. 4 processes the received metadata to identify one or more clusters (e.g., one or more of the example clusters 130a-b) and/or the one or more ToR switches 110, 112, 116, 118, spine switches 122, and/or other network elements corresponding to the rebalancing event. Because each cluster 130a, 130b of the hosts 128 corresponds to a different combination of switches and a rebalancing event is better executed using larger buffers within a switch, the example cluster identifier 402 identifies the cluster corresponding to the rebalancing event to optimize the memory allocation of the corresponding switches. In some examples, a rebalancing event does not require network access. Accordingly, the rebalancing event will not require larger buffers to facilitate the network activity associated with a rebalancing event. In such examples, the example cluster identifier 402 determines if the identified cluster(s) requires network access. If the identified cluster(s) does not require network access, then then adjusting the memory buffers will not have an effect on the rebalancing effect and therefore will be omitted.

The example buffer configuration determiner 404 of FIG. 4 configures the buffers (e.g., MTU buffers) of the example switches 110, 112, 116, 118, 122 in response to a rebalancing event by the example storage virtualizer 218. During a storage rebalancing event, switches may drop storage virtualizer (e.g., VIRTUAL SAN™) packets as the switches run out of jumbo buffers. Accordingly, a rebalancing event requires more (e.g., higher) bandwidth to minimize the probability of dropping a VIRTUAL SAN™ packet (e.g., a jumbo MTU packet). The example buffer configuration determiner 404 meets such higher bandwidth requirements by allocating more bandwidth to jumbo packets (e.g., as opposed to non-jumbo buffers). In response to the example cluster identifier 402 identifying the network switches (e.g., ToR switches 110, 112, 116, 118 and/or spine switches 122) corresponding to the rebalancing event, the example buffer configuration determiner 404 configures the buffers of the corresponding network switches 110, 112, 116, 118, 122 to reallocate the buffer resources to include more jumbo buffers. For example, if the example network switches 110, 112, 116, 118, 122 include 12 Megabytes (Mb) of packet buffer memory, a default buffer configuration may include 2048 of 2 Kilobyte (Kb) sized buffers (e.g., non-jumbo buffers), 1024 of 4 Kb size buffers (e.g., non-jumbo buffers) and 512 of 8 Kb sized buffers (e.g., jumbo MTU buffers), the example buffer configuration determiner 404 may reallocate the buffer memory to include 1024 of 2 Kilobyte (Kb) sized buffers, 512 of 4 Kb size buffers and 1024 of 8 Kb sized buffers (e.g., jumbo MTU buffers), thereby doubling the number of jumbo buffers. The characteristics of temporary buffer reallocation may be based on user and/or manufacture preferences.

The example switch configuration adjuster 406 of FIG. 4 adjusts the configurations of the storage virtualizer 218 and/or network virtualizer 212 in the example hypervisor 210 during/in response to the reallocation of buffer memory. For example, the switch configuration adjuster 406 may adjust the quality of service (QoS) profile or the equal cost multi-path (ECMP) profile to correspond to the reallocation of buffer memory in order to ensure that the storage virtualizer/network virtualizer functionalities work with the reallocated buffer memory structure. The QoS profile is implemented by the example storage virtualizer 218 to enable a customer to create differentiated service offerings using the same cluster of storage to mix diverse workloads without the workloads impacting each other. Accordingly, the example switch configuration adjuster 406 adjusts the QoS profile in the example switches 110, 112, 116, 118, 122 so that the example storage virtualizer 218 can continue to create differentiated service offerings using the reallocated buffers. The ECMP profile implemented in the example switches 110, 112, 116, 118, 122 by the example network virtualizer 212 allows deployment of one or more NSX™ applications. When the buffer storage is reallocated, the ECMP profile is updated so that the example network virtualizer 212 can continue to virtualize network resources according to the new buffer storage configuration.

The example timer 408 of FIG. 4 tracks the amount of time since an occurrence of a rebalancing event. For example, when a rebalancing event is identified by the example telematics agent 306a, 306b (e.g., corresponding to the example receiver 400 receiving a rebalancing event trigger from the example telematics agent 306a, 306b), the example timer 408 initiates a timer (e.g., a countdown timer). The example timer 408 tracks the countdown timer until the countdown ceases. The example timer 408 transmits a countdown end trigger in response to the end of the countdown to trigger a reallocation of buffer resources back to a default configuration. The duration of time corresponding to the countdown timer may be preset and/or adjustable based on user and/or manufacturer preferences.

The example transmitter 410 of FIG. 4 transmits instructions to the example resource configuration agent(s) (RCA) 312a, 312b to reallocate buffer resources to generate more super buffers in response to a host/disk rebalance event. Additionally, in response to an end of a countdown and/or the example receiver 400 receiving a reallocation end event, the example transmitter 410 transmits instructions to the example RCA(s) 312a, 312b to reallocate buffer resources back to a default configuration. In some examples, the transmitter 410 transmits instructions to the example hypervisor 210 to update the QoS profile and the ECMP profile (e.g., system profiles) in response to a reallocation of buffer resources (e.g., to increase the number of super buffers and/or to return the buffer resources back to a default configuration).

The example telematics agents 306a, 306b include the example filters 450 of FIG. 4. The example filters 450 are located in the example ToR switch(es) 110, 112, 116, 118 and the example spine switch(es) 122. The example filters 450 gather metadata packets corresponding to the storage virtualizer 218 of FIGS. 2 and/or 3 (e.g., VIRTUAL SAN™ metadata packets). The example rebalancing detector 452 of FIG. 4 inspects the metadata packets gathered by the example filters 450 to determine if a rebalance signature is present based on the received metadata packets. After the example rebalancing detector 452 determines that a rebalance signature is present, the example transmitter 454 transmits the rebalance signature and/or the metadata corresponding to the signature to the example decision engine 310 to identify that a rebalancing event is occurring. In this manner, the example cluster identifier 402 can process the received rebalancing data (e.g., the rebalance signature and corresponding metadata) to determine which hosts/disks correspond to the rebalancing event, as further described above.

While an example manner of implementing the example environment migrator 310 and the example telematics agent 306a, 306b of FIG. 3 is illustrated in FIG. 4, one or more of the elements, processes and/or devices illustrated in FIG. 4 may be combined, divided, re-arranged, omitted, eliminated, and/or implemented in any other way. Further, the example receiver 400, the example cluster identifier 402, the example buffer configuration determiner 404, the example switch configuration adjuster 406, the example timer 408, the example transmitter 410, and/or, more generally, the example decision engine 310 of FIG. 4, and/or the example filters 450, the example rebalance detector 452, the example transmitter 454, and/or, more generally, the example telematics agent 306a, 306b may be implemented by hardware, software, firmware and/or any combination of hardware, software and/or firmware. Thus, for example, any of the example receiver 400, the example cluster identifier 402, the example buffer configuration determiner 404, the example switch configuration adjuster 406, the example timer 408, the example transmitter 410, and/or, more generally, the example decision engine 310 of FIG. 4, and/or the example filters 450, the example rebalance detector 452, the example transmitter 454, and/or, more generally, the example telematics agent 306a, 306b could be implemented by one or more analog or digital circuit(s), logic circuits, programmable processor(s), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, at least one of the example receiver 400, the example cluster identifier 402, the example buffer configuration determiner 404, the example switch configuration adjuster 406, the example timer 408, the example transmitter 410, and/or, more generally, the example decision engine 310 of FIG. 4, and/or the example filters 450, the example rebalance detector 452, the example transmitter 454, and/or, more generally, the example telematics agent 306a, 306b is/are hereby expressly defined to include a non-transitory computer readable storage device or storage disk such as a memory, a digital versatile disk (DVD), a compact disk (CD), a Blu-ray disk, etc. including the software and/or firmware. Further still, the example receiver 400, the example cluster identifier 402, the example buffer configuration determiner 404, the example switch configuration adjuster 406, the example timer 408, the example transmitter 410, and/or, more generally, the example decision engine 310 of FIG. 4, and/or the example filters 450, the example rebalance detector 452, the example transmitter 454, and/or, more generally, the example telematics agent 306a, 306b may include one or more elements, processes and/or devices in addition to, or instead of, those illustrated in FIG. 4, and/or may include more than one of any or all of the illustrated elements, processes, and devices.

Flowcharts representative of example machine readable instructions for implementing the example receiver 400, the example cluster identifier 402, the example buffer configuration determiner 404, the example switch configuration adjuster 406, the example timer 208, the example transmitter 410, and/or, more generally, the example decision engine 310 of FIG. 4, and/or the example filters 450, the example rebalance detector 452, the example transmitter 454, and/or, more generally, the example telematics agent 306a, 306b are shown in FIGS. 5A-7. In these examples, the machine readable instructions comprise a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5A-7, many other methods of deploying, evaluating, and installing services on component servers in accordance with the teachings of this disclosure may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5A-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Figure 5A:
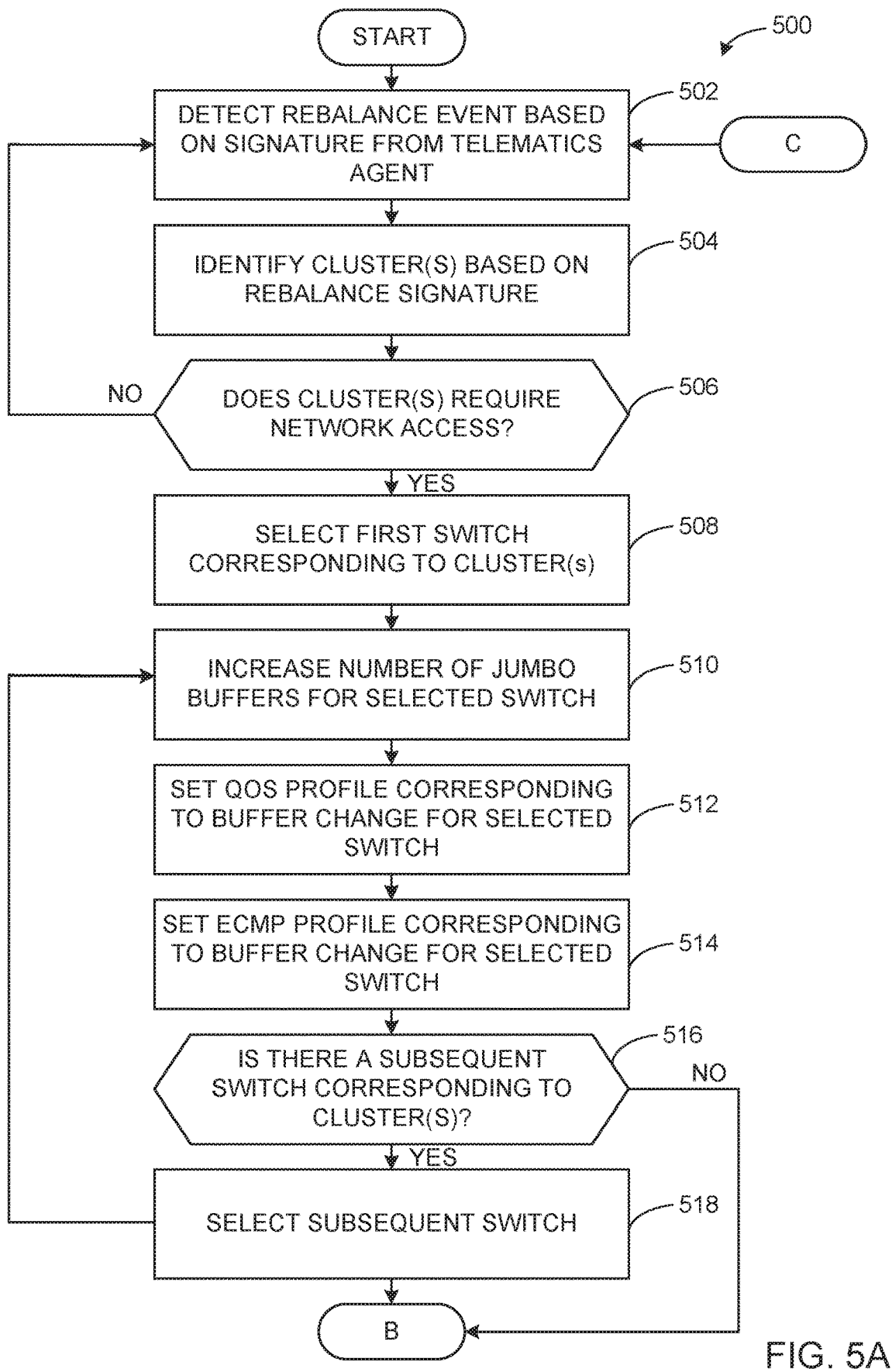
FIGS. 5A-5B depict a flowchart representative of computer readable instructions that may be executed to implement the decision agent of FIG. 3 and/or 4.
Figure 5B:
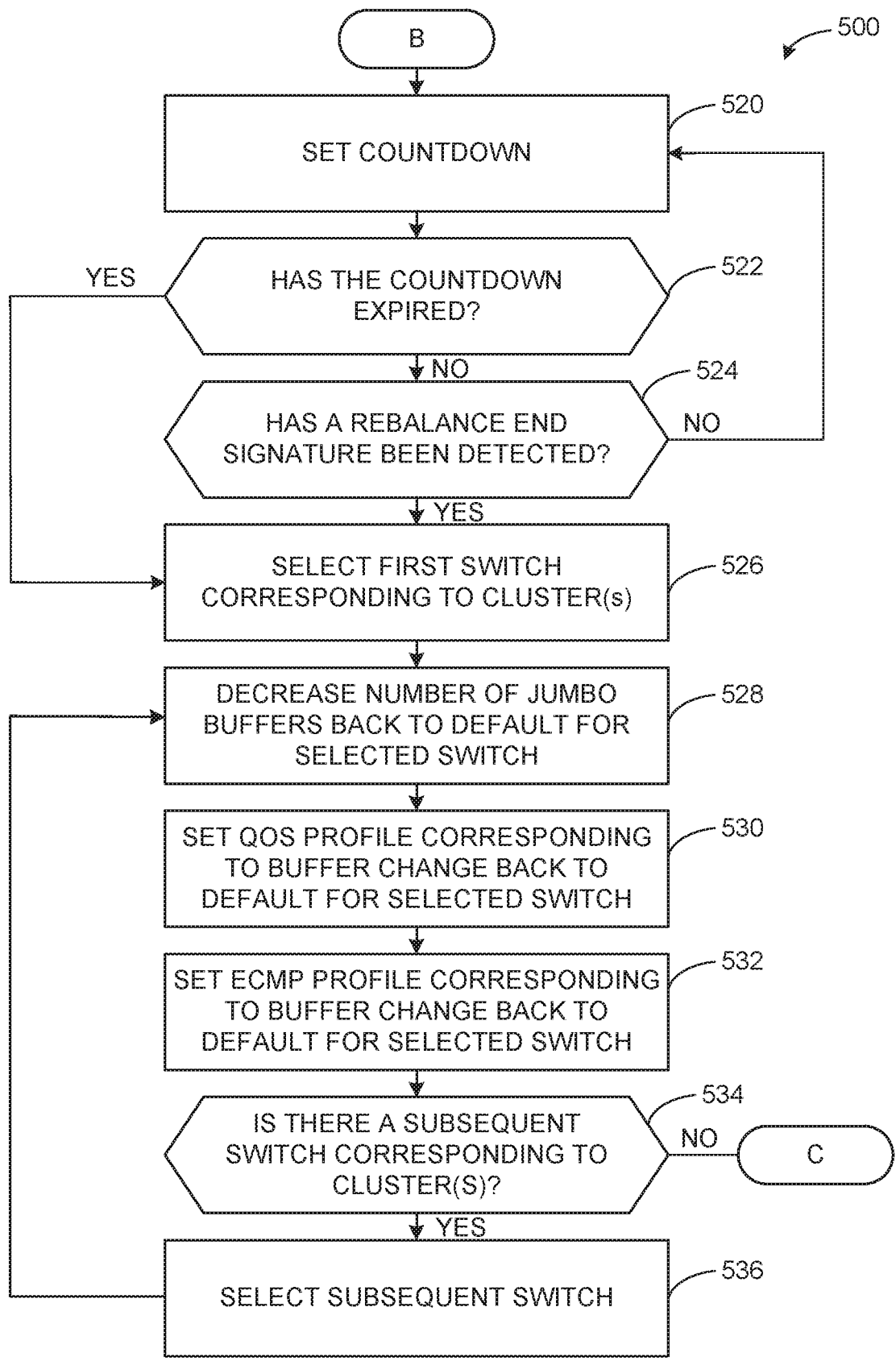

FIGS. 5A-5B depict an example flowchart 500 representative of computer readable instructions that may be executed to implement the example decision engine 310 of FIG. 4 to reallocate buffer resources in the network switches (e.g., the example ToR switch(es) 110, 112, 116, 118 and/or the example spine switch(es) 122 of FIGS. 1-3) during a host/disk rebalance event. Although the flowchart 500 of FIGS. 5A-5B is described in conjunction with the example decision engine 310 in the system of FIG. 3, the process may be implemented using any type of decision engine in any type of cloud system.

Initially, at block 502, the example receiver 400 detects a rebalance event based on a signature from one or more of the example telematics agents 306a, 306b. An example rebalancing event detection is further described below in conjunction with FIG. 6. At block 504, the example cluster identifier 402 identifies the cluster (e.g., the example cluster 130a, 130b) corresponding to the rebalancing event based on the rebalance signature. In some examples, the cluster identifier 402 processes the signature and/or metadata corresponding to the signature to determine the cluster of hosts corresponding to the rebalancing event.

At block 506, the example cluster identifier 402 determines whether the identified cluster(s) requires network access. Some clusters may rebalance without requiring network access. Accordingly, reallocating the buffer configuration for such clusters is not necessary. If the example cluster identifier 402 determines that the identified cluster(s) do not require network access (block 506: NO), the process returns to block 502. If the example cluster identifier 402 determines that the identified cluster(s) do require network access (block 506: YES), the example buffer configuration determiner 404 selects a first switch of the example ToR switch(es) 110, 112, 116, 118 and/or the example spine switch(es) 112 corresponding to the identified cluster (block 508).

At block 510, the example buffer configuration determiner 404 increases the number of jumbo buffers for the selected switch. As described above in conjunction with FIG. 4, the example buffer configuration determiner 404 increases the number of jumbo buffers by changing the buffer configuration to decrease the number of non-jumbo buffers and increase the number of jumbo buffers. For example, the example buffer configuration determiner 404 may create an 8 Kb sized jumbo buffer by combining four 2 Kb sized buffers, two 4 Kb sized buffers, or a 4 Kb sized buffer and two 2 Kb sized buffers, thereby increasing the number of jumbo buffers at the expense of smaller sized buffers to facilitate optimal conditions for a rebalancing event.

At block 512, the example switch configuration adjuster 406 sets and/or changes the QoS profile corresponding to the buffer change for the selected switch. In this manner, the example storage virtualizer 218 can continue to create differentiated service offerings based on the buffer change. At block 514, the example switch configuration adjuster 406 sets and/or changes the ECMP profile corresponding to the buffer change for the selected switch. In this manner, the example storage virtualizer 218 can continue to virtualize network resources based on the buffer change. At block 516, the example buffer configuration determiner 404 determines if there is a subsequent switch corresponding to the identified cluster(s).

If the example buffer configuration determiner 404 determines that there is a subsequent switch corresponding to the cluster(s) (block 516: YES), the example buffer configuration determiner 404 selects the subsequent switch (block 518) and the process returns to block 510 to continue to increase the number of jumbo switches for switches corresponding to the identified cluster. If the example buffer configuration determiner 404 determines that there is not a subsequent switch corresponding to the cluster(s) (block 516: NO), the example timer 408 sets the countdown timer (block 520). At block 522, the example timer 408 determines if the countdown has expired. If the example timer 408 determines that the countdown has expired (block 522: YES), the process continues to block 526, as further described below. If the example timer 408 determines that the countdown has not expired (block 522: NO), the example receiver 400 determines if a rebalance end signature has been detected by the example telematics agent 306a, 306b (block 524).

If the example receiver 400 determines that a rebalance end signature has not been detected by the example telematics agent 306a, 306b (block 524: NO), the process returns to block 520 until the countdown expires or a rebalance end signature is received. If the example receiver 400 determines that a rebalance end signature has been detected by the example telematics agent 306a, 306b (block 524: YES), the example buffer configuration determiner 404 selects a first switch corresponding to the identified cluster(s) (block 526). At block 528, the example buffer configuration determiner 404 decreases the number of jumbo buffers back to the default number of jumbo buffers for the selected switch. The example buffer configuration determiner 404 decreases the number of jumbo buffers by changing the buffer configuration to increase the number of smaller non-jumbo buffers and decrease the number of jumbo filters back to the default configuration.

At block 530, the example switch configuration adjuster 406 sets and/or changes the QoS profile corresponding to the buffer change back to default for the selected switch. In this manner, the example storage virtualizer 218 can continue to create differentiated service offerings based on the buffer change back to default. At block 532, the example switch configuration adjuster 406 sets and/or changes the ECMP profile corresponding to the buffer change back to default for the selected switch. In this manner, the example storage virtualizer 218 can continue to virtualize network resources based on the buffer change back to default. At block 534, the example buffer configuration determiner 404 determines if there is a subsequent switch corresponding to the identified cluster(s).

If the example buffer configuration determiner 404 determines that there is a subsequent switch corresponding to the cluster(s) (block 534: YES), the example buffer configuration determiner 404 selects the subsequent switch (block 536) and the process returns to block 510 to continue to decrease the number of jumbo switches for switches corresponding to the identified cluster back to a default configuration. If the example buffer configuration determiner 404 determines that there is not a subsequent switch corresponding to the cluster(s) (block 536: NO), the process returns to block 502 until a subsequent rebalance event is detected.

Figure 6:
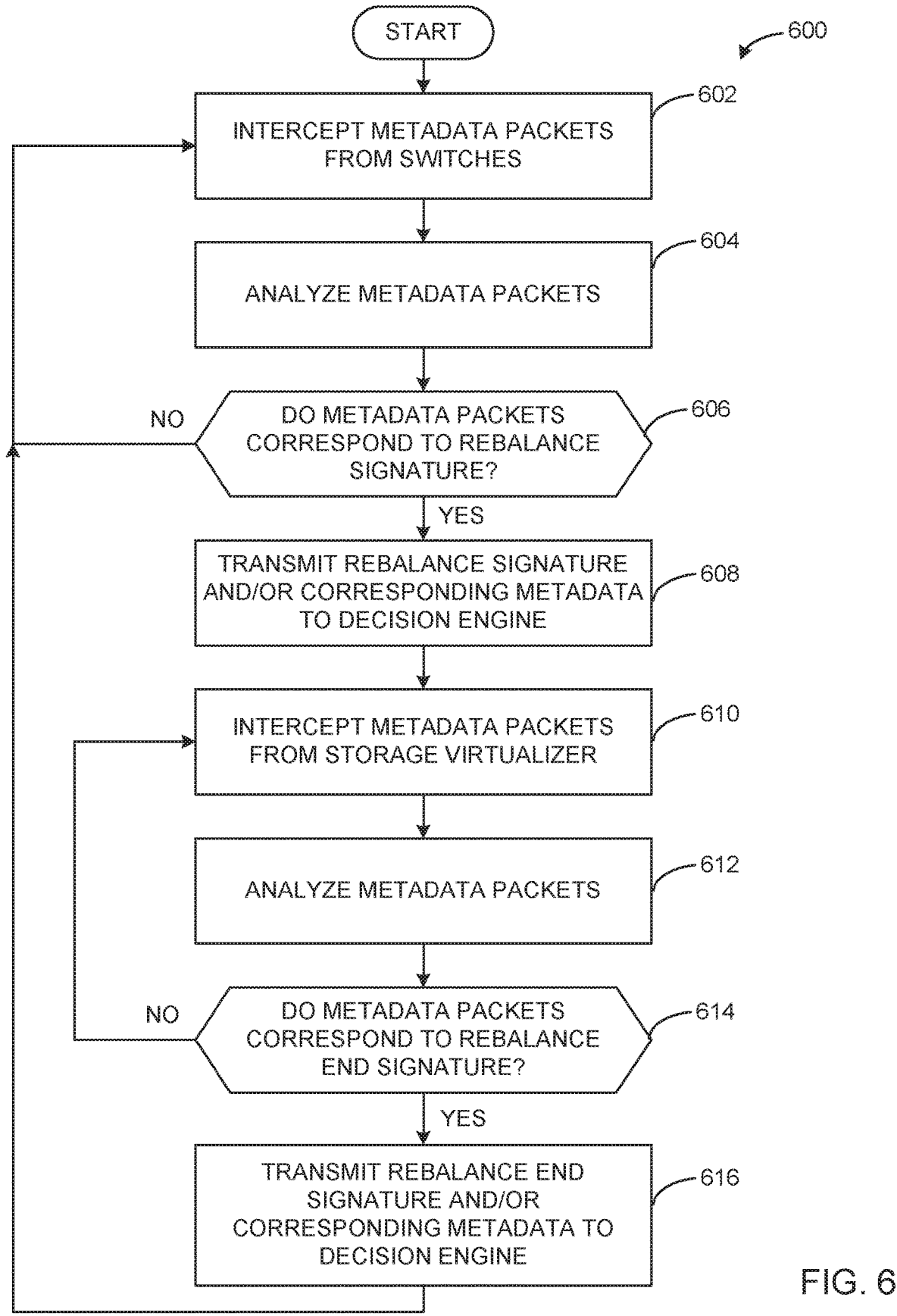
FIG. 6 depicts a flowchart representative of computer readable instructions that may be executed to implement the telematics agent of FIG. 3 and/or 4.

FIG. 6 depicts an example flowchart 600 representative of computer readable instructions that may be executed to implement the example telematic agent 306a, 306b of FIG. 4 to detect a host/disk rebalance event. Although the flowchart 600 of FIG. 6 is described in conjunction with the example telematics agent 306a, 306b in the system of FIG. 3, the process may be implemented using any type of telematics agent in any type of cloud system.

At block 602, the example filters 450 intercept metadata packets (e.g., VIRTUAL SAN™ metadata packets) being communicated through the network switches (e.g., the example ToR switch(es) 110, 112, 116, 118 and/or the example spine switch(es) 122 of FIG. 1). At block 604, the example rebalance detector 452 analyzes the metadata packets. As described above in conjunction with FIG. 4, the example rebalance detector 452 analyzes the metadata packets to determine if the metadata packets correspond to a rebalance signature.

At block 606, the example rebalance detector 452 determines if the metadata packets correspond to a rebalance signature. If the example rebalance detector 452 determines that the metadata packets do not correspond to a rebalance signature (block 606: NO), the process returns to block 602 to continue to intercept metadata packets until a rebalance signature occurs. If the example rebalance detector 452 determines that the metadata packets do correspond to a rebalance signature (block 606: YES), the example transmitter 454 transmits the rebalance signature and/or any corresponding metadata to the example decision engine 310 (block 608).

At block 610, the example filters 450 intercept metadata packets being communicated through the network switches (e.g., the example ToR switch(es) 110, 112, 116, 118 and/or the example spine switch(es) 122). At block 612, the example rebalance detector 452 analyzes the metadata packets. As described above in conjunction with FIG. 4, the example rebalance detector 452 analyzes the metadata packets to determine if the metadata packets correspond to a rebalance end signature.

At block 614, the example rebalance detector 452 determines if the metadata packets correspond to a rebalance end signature. If the example rebalance detector 452 determines that the metadata packets do not correspond to a rebalance end signature (block 614: NO), the process returns to block 610 to continue to intercept metadata packets until a rebalance end signature occurs. If the example rebalance detector 452 determines that the metadata packets do correspond to a rebalance end signature (block 614: YES), the example transmitter 454 transmits the rebalance end signature and/or any corresponding metadata to the example decision engine 310 (block 616) and the process returns to block 602.

Figure 7:
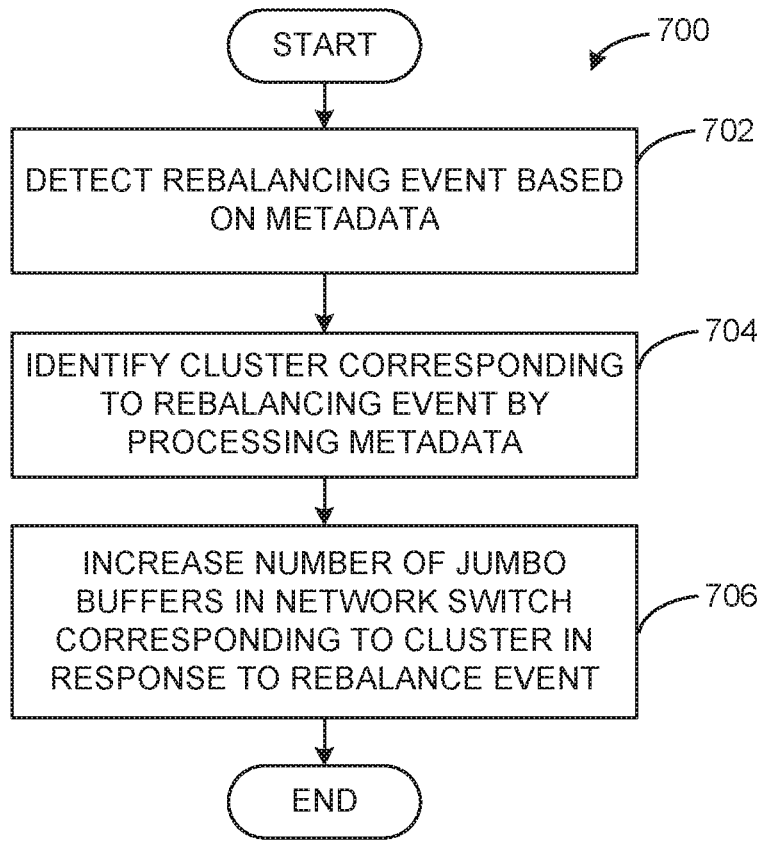
FIG. 7 depicts a flowchart representative of computer readable instructions that may be executed to implement the decision engine and the telematics agent of FIG. 3 and/or 4.

FIG. 7 depict an example flowchart 700 representative of computer readable instructions that may be executed to implement the example decision engine 310 of FIG. 4 and the example telematics agent 306a, 306b to reallocate buffer resources in the network switches (e.g., the example ToR switch(es) 110, 112, 116, 118 and/or the example spine switch(es) 122 of FIGS. 1-3) during a host/disk rebalance event. Although the flowchart 700 of FIG. 7 is described in conjunction with the example decision engine 310 and the example telematics agent 306a, 306b in the system of FIG. 3, the process may be implemented using any type of decision engine and/or telematics agent in any type of cloud system.

At block 702, the example telematics agents 306a, 306b detect a rebalancing event based on metadata. For example, the filters 450 of the example telematics agents 306a, 306b intercept the metadata and the example rebalance detector 452 of the example telematics agents 306a, 306b detect a rebalancing event based on a rebalance signature corresponding to the metadata. At block 704, the example decision engine 310 identifies, by processing the metadata, a cluster corresponding to the rebalancing event. For example, the cluster identifier 402 of the example decision engine 310 processes the metadata corresponding to the rebalance signature to identify which cluster corresponds to the rebalancing event. At block 706, the example decision engine 310 increases a number of jumbo buffers in a network switch corresponding to the cluster in response to the rebalancing event. For example, the buffer configuration determiner 404 of the example decision engine 310 increases the number of jumbo buffers in the example ToR switches 110, 112, 116, 118, the example spine switches 122, and/or any other network resources corresponding to the cluster by sending instructions to the example RCA(2) 312a, 312b.

Figure 8:
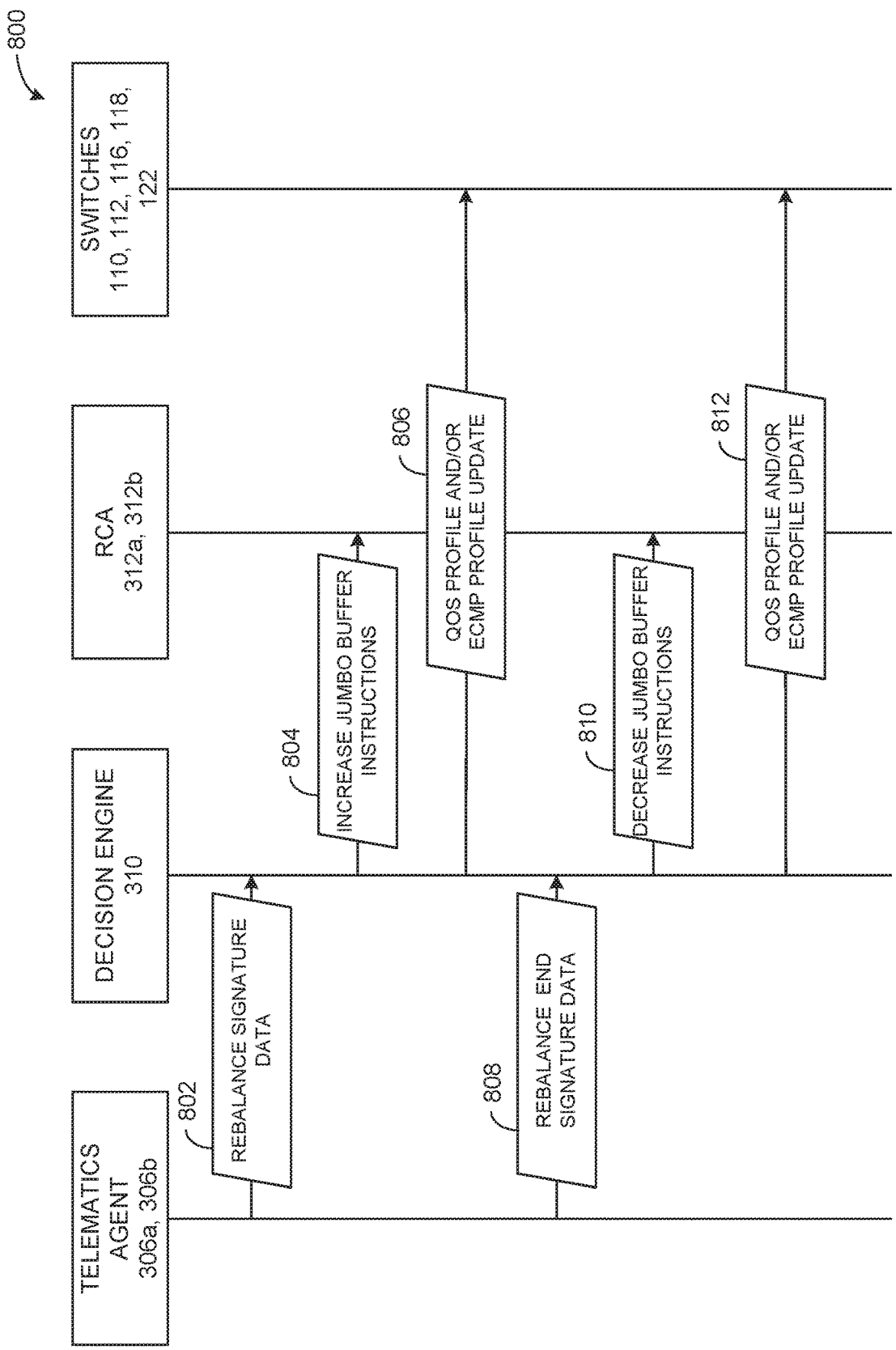
FIG. 8 illustrates the communications between the example telematics agent, the example decision engine, an example resource configuration agent, and an example hypervisor of FIGS. 1, 2, 3, and/or 4.

FIG. 8 is an example communications diagram 800 illustrating communications between the example telematics agent 306a, 306b, the example decision engine 310, the example RCA 312a, 314b, and the example switches 110, 112, 116, 118, 122 of FIGS. 3 and/or 4.

Initially, one or more of the example telematics agents 306a, 306b transmit the example rebalance signature data 802 to the example decision engine 310. The example rebalance signature data 802 indicates that a host/disk rebalancing event has occurred and may include metadata corresponding to the rebalancing event. In response to receiving the rebalance signature data 802, the example decision engine 310 determines which ToR switch(es) 110, 112, 116, 118 and/or spine switch(es) 122 correspond to the rebalancing event and transmit the example increase jumbo buffer instructions 804 to the example RCA 312a, 312b. In response to receiving the increase jumbo buffer instructions 804, the example RCA 312a, 312b increases the jumbo buffers for the switches corresponding to the rebalancing event. Additionally, the example decision engine 310 transmits the example QoS profile and/or ECMP profile update 806 to the example switches 110, 112, 116, 118, 122 (e.g., the network virtualizer 212 and the example storage virtualizer 218, respectively). In this manner, the example network virtualizer 212 and the example storage virtualizer 218 can update the respective system profiles to continue to operate with the buffer configuration change of the switches corresponding to the rebalancing event.

In some examples, one or more of the example telematics agents 306a, 306b transmit the example rebalance end signature data 808 to the example decision engine 310. The example rebalance end signature data 808 indicates that a host/disk rebalancing event has ended and may include metadata corresponding to the rebalancing end event. In response to receiving the rebalance end signature data 808, the example decision engine 310 determines which ToR switch(es) 110, 112, 116, 118 and/or spine switch(es) 122 correspond to the rebalancing end event and transmit the example decrease jumbo buffer instructions 810 to the example RCA 312a, 312b. In response to receiving the decrease jumbo buffer instructions 810, the example RCA 312a, 312b decreases the jumbo buffers for the switches corresponding to the rebalancing end event, thereby restoring the buffers to a default configuration. Additionally, the example decision engine 310 transmits the example QoS profile and/or ECMP profile update 812 to the example switches 110, 112, 116, 118, 122 (e.g., the network virtualizer 212 and the example storage virtualizer 218, respectively). In this manner, the example network virtualizer 212 and the example storage virtualizer 218 can update the respective system profiles to continue to operate with the buffer configuration restored back to the default configuration of the switches corresponding to the rebalancing end event.

Figure 9:
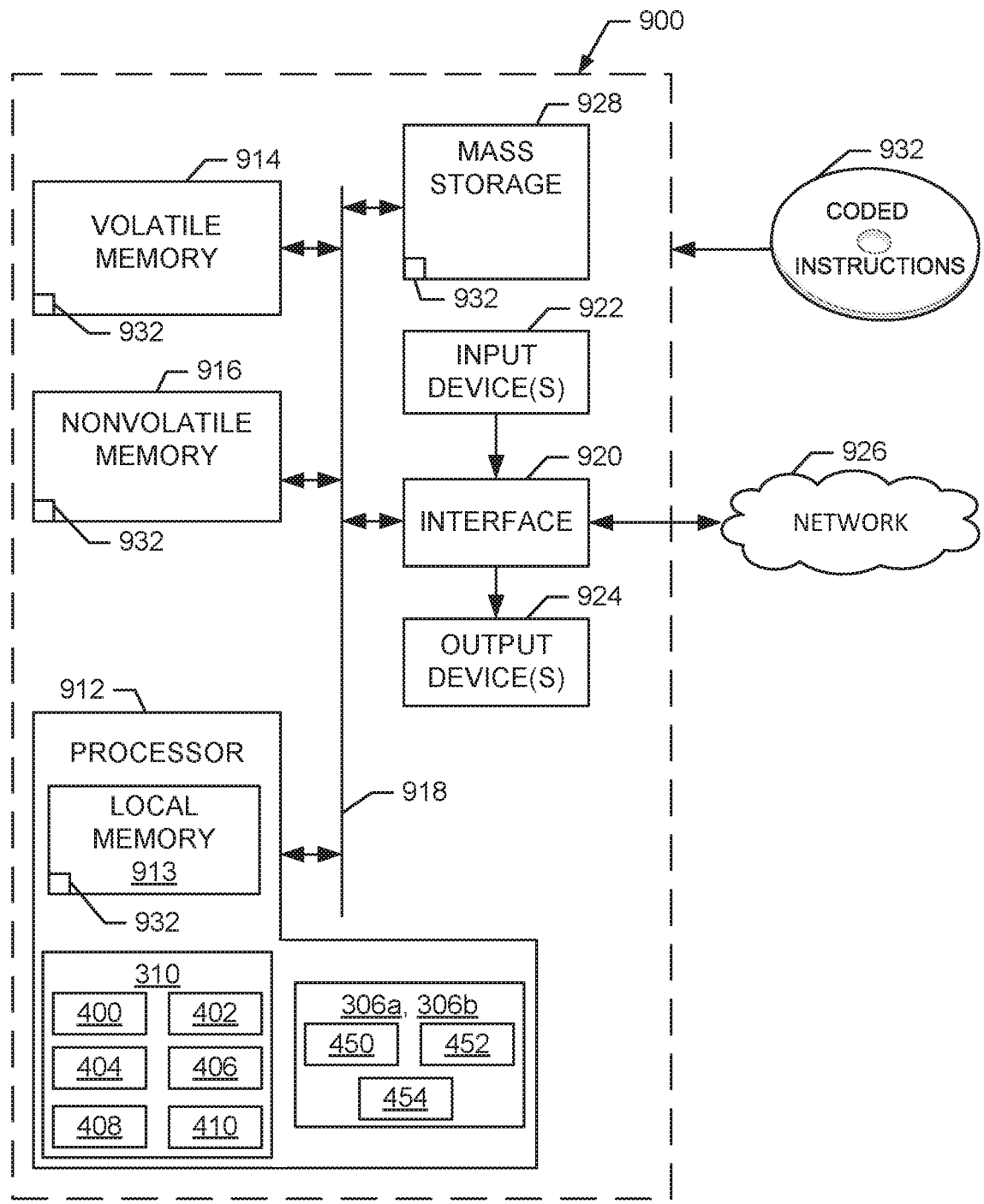
FIG. 9 is a block diagram of an example processing platform capable of executing the example machine-readable instructions of FIGS. 5A-6 to implement the example decision engine and/or the example telematics agent of FIG. 3 and/or 4.

FIG. 9 is a block diagram of an example processor platform 900 capable of executing the instructions of FIGS. 5A-6 to implement the example systems, operation, and management of FIGS. 1-4. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware may be a semiconductor based (e.g., silicon based) device. In this example, the processor implements the example decision engine and/or the example telematics agent 306a, 306b, or portions thereof, such as the example receiver 400, the example cluster identifier, the example switch configuration adjuster 406, the example timer 408, the example transmitter 410, the example filters 450, the example rebalance detector 452, and/or the example transmitter 454.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or NIC to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include flash devices, floppy disk drives, hard drive disks, optical compact disk (CD) drives, optical Blu-ray disk drives, RAID systems, and optical digital versatile disk (DVD) drives.

Coded instructions 932 representative of the example machine readable instructions of FIGS. 5A-6 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture optimize memory allocation in response to storage (e.g., a network host and/or disk) rebalancing event. Examples disclosed herein improve the system response to a rebalancing event of prior systems by reallocating switch buffer resources to increase the number of jumbo buffers. When a host and/or disk of a cluster of hosts goes down in a rack of host servers, a rebalancing event occurs to rebalance the load using the remaining hosts and/or disks in the cluster. Such a rebalancing event is best served using jumbo buffers in the network switches to facilitate communications during the event. However, traditional systems include a predetermined number of jumbo buffers. Accordingly, when a rebalancing event occurs in such traditional systems, jumbo packets corresponding to the rebalancing events may be dropped. Examples disclosed herein alleviate the problems of such traditional systems by detecting when a rebalancing act is occurring and, in response to detecting the rebalancing event, reallocate the network switches' buffer configurations to increase the number of jumbo buffers during the rebalancing event, thereby reducing the risk of dropping jumbo packets during the rebalancing event. Additionally, when the rebalancing event has ended, examples disclosed herein return the network switches' buffer configurations back to a default setting (e.g., when the increased number of jumbo buffers is not necessary and/or desired).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a telematics agent to detect a rebalancing event based on metadata, the rebalancing event being a rearrangement of server hosts in a cluster at a physical rack; and
a decision engine to:
identify the cluster of the server hosts that are being rearranged at the physical rack by processing the metadata;
in response to determining that the server hosts in the cluster are being rearranged at the physical rack, reallocate buffer resources of a network switch at the physical rack to increase a first number of jumbo buffers in the network switch at the physical rack and decrease a second number of non-jumbo buffers in the network switch at the physical rack, the jumbo buffers configured to store first data packets having a first size, the non-jumbo buffers configured to store second data packets having a second size less than the first size, at least one of the telematics agent or the decision engine including hardware; and
in response to transmitting an update to a system profile to a hypervisor, invoke the hypervisor to virtualize network resources associated with the network switch based on the increase of the first number of the jumbo buffers and the decrease of the second number of the non-jumbo buffers, the update based on the reallocation of the buffer resources.

2. The apparatus of claim 1, wherein the telematics agent is to detect the rebalancing event by:
intercepting metadata packets from the network switch; and
analyzing the metadata packets to identify a rebalance signature.

3. The apparatus of claim 2, wherein the telematics agent is to transmit the rebalance signature to the decision engine.

4. The apparatus of claim 3, wherein the decision engine is to identify the cluster based on information in the rebalance signature.

5. The apparatus of claim 1, further including a resource configuration agent to reallocate the buffer resources of the network switch to increase the first number of jumbo buffers and decrease the second number of non-jumbo buffers based on instructions from the decision engine.

6. The apparatus of claim 1, wherein the the system profile includes at least one of a quality of service profile or an equal-cost multi-path profile.

7. The apparatus of claim 1, wherein the decision engine is to, in response to receiving a trigger signifying that the rearrangement of the server hosts has ended, decrease the first number of jumbo buffers in the network switch and increase the second number of non-jumbo buffers to a default configuration.

8. The apparatus of claim 7, wherein the telematics agent is to detect an end of the rearrangement of the server hosts based on second metadata.

9. The apparatus of claim 8, wherein the decision engine is to track a duration of time corresponding to the rebalancing event, the trigger corresponding to the duration of time.

10. The apparatus of claim 1, wherein the update is a first update, the rearrangement of the server hosts in the cluster at the physical rack is in response to one or more server-attached disk drives being added or removed from the cluster, and, in response to a conclusion of the rebalancing event, the decision engine to:
decrease the first number of the jumbo buffers;
increase the second number of the non-jumbo buffers; and
transmit a second update to the system profile to the hypervisor to invoke the hypervisor to virtualize the network resources associated with the network switch based on the update.

11. A method comprising:
detecting a rebalancing event based on metadata, the rebalancing event being a rearrangement of server hosts in a cluster at a physical rack;
identifying the cluster of the server hosts that are being rearranged at the physical rack by processing the metadata;
in response to determining that the server hosts in the cluster are being rearranged at the physical rack, reallocating buffer resources of a network switch at the physical rack to increase a first number of jumbo buffers in the network switch at the physical rack and reduce a second number of non-jumbo buffers in the network switch at the physical rack, the jumbo buffers configured to store first data packets having a first size, the non-jumbo buffers configured to store second data packets having a second size less than the first size; and
in response to transmitting an update to a system profile to a hypervisor, invoking the hypervisor to virtualize network resources associated with the network switch based on the increase of the first number of the jumbo buffers and the reduction of the second number of the non-jumbo buffers, the update based on the reallocation of the buffer resources.

12. The method of claim 11, wherein detecting the rebalancing event includes:
intercepting metadata packets from the network switch; and
analyzing the metadata packets to identify a rebalance signature.

13. The method of claim 12, further including transmitting the rebalance signature to a decision engine.

14. The method of claim 13, wherein the cluster is identified based on information in the rebalance signature.

15. The method of claim 11, wherein the system profile includes at least one of a quality of service profile or an equal-cost multi-path profile.

16. The method of claim 11, further including decreasing, in response to receiving a trigger signifying that the rearrangement of the server hosts has ended, the first number of jumbo buffers in the network switch and increase the second number of non-jumbo buffers to a default configuration.

17. The method of claim 16, further including detecting an end of the rearrangement of the server hosts based on second metadata.

18. The method of claim 17, further including tracking a duration of time corresponding to the rebalancing event, the trigger corresponding to the duration of time.

19. A non-transitory computer readable storage medium comprising instructions which, when executed, cause a machine to at least:
detect a rebalancing event based on metadata, the rebalancing event being a rearrangement of server hosts in a cluster at a physical rack;
identify the cluster of the server hosts that are being rearranged at the physical rack by processing the metadata;
in response to determining that the server hosts in the cluster are being rearranged at the physical rack, reallocate buffer resources of a network switch at the physical rack to increase a first number of jumbo buffers in the network switch at the physical rack and decrease a second number of non-jumbo buffers in the network switch at the physical rack, the jumbo buffers configured to store first data packets having a first size, the non-jumbo buffers configured to store second data packets having a second size less than the first size; and in response to transmitting an update to a system profile to a hypervisor, invoke the hypervisor to virtualize network resources associated with the network switch based on the increase of the first number of the jumbo buffers and the decrease of the second number of the non-jumbo buffers, the update based on the reallocation of the buffer resources.

20. The non-transitory computer readable storage medium of claim 19, wherein the instructions, when executed, cause the machine to detect the rebalancing event by:

intercepting metadata packets from the network switch; and analyzing the metadata packets to identify a rebalance signature.

\* \* \* \* \*